Aug. 5, 1969     H. L. WAHN     3,459,350

METHOD AND APPARATUS FOR PUNCHING

Filed Oct. 11, 1967

INVENTOR.
HARVEY L. WAHN
BY
ATTORNEYS

United States Patent Office 3,459,350
Patented Aug. 5, 1969

3,459,350
METHOD AND APPARATUS FOR PUNCHING
Harvey L. Wahn, Grand Rapids, Mich., assignor to Corduroy Rubber Co., Grand Rapids, Mich., a corporation of Delaware
Filed Oct. 11, 1967, Ser. No. 674,547
Int. Cl. B26f 1/02, 3/02
U.S. Cl. 225—2                                    11 Claims

ABSTRACT OF THE DISCLOSURE

A method of and/or apparatus for punching the plug from the inside diameter of a molded, flexible component, for example, a bushing, wherein the boundary between the plug and the adjacent material is weakened by means of a peripherally broken die. Subsequent to weakening, the webbing-connected sheet is placed on a suitable platform and a sharpened fixture brought into contact with the plug, preferably penetrating it. A blunt punch member which axially surrounds the sharpened fixture is then butted against the plug and forced through the surrounding material to separate the plug therefrom. The penetrated pin prevents the plug from sliding to one side during the punching process. The pin or sharpened fixture is then withdrawn with respect to the blunt punch member to cause the plug to drop free. It is understood that this abstract is not to be utilized to limit the scope of this invention.

Background

This invention relates to methods of and/or apparatus for punching and, more particularly, to methods and apparatus for removing a section of relatively flexible material such as synthetic rubber or the like from the surrounding material.

During the fabrication of many types of flexible components such as those formed from thermosetting elastomers, certain types of other flexible plastics and the like, it is necessary to form the initial blank with the plastic or rubber material extending over or otherwise closing off what is to be eventually a passageway through the article. Such extension or closing is necessitated usually by the properties of the material, it being necessary to permit such a formation in order to insure that the finished component will have satisfactory operating characerics. Thus, for example, in the fabrication of thermosetting elastomer automotive bushings or mounts, the molds are usually designed such that the components emerge therefrom in a grid pattern connected at their exterior or outside diameters by a webbing and having a flashing or plug closing off their inside diameters.

Because of the tendency for materials of this type to stretch or push ahead of a die, a great deal of difficulty has been experienced in removing the unwanted sections—i.e. the webbing and the plug—from the individual components. Such has been particularly true in the case of the plug which covers the inside diameter of the component.

It has been proposed, for example, to cut the inside diameter plug free from the surrounding material by forcing an aperture-conforming die into the inside diameter of each of the components while the components are resting on a suitable work bed. The above noted tendency of the material to stretch and push ahead of the die, however, invariably results in the retention of the plugs to the surrounding components at one or more points about their connecting boundaries. Such will certainly be the case for at least some of the components in a given sheet of stock. Thus, the sheet is usually examined after a die-cutting process of this type and the remaining plugs either cut away or pulled free by hand, the disadvantages of such a process being readily apparent.

Objects and specification

It is an object of this invention, therefore, to provide a method and/or apparatus for removing a section of relatively flexible material from the surrounding material which is not subject to the disadvantages which have plagued the art heretofore.

More particularly, it is an object of this invention to provide such a method and/or apparatus wherein the sections desired to be removed may be cleanly and automatically served from the surrounding material in all of the components in a particular sheet of stock.

It is an object of this invention to provide a method and/or apparatus of the type described which requires a relatively small capital investment in equipment, the operative components of which are both simple and sturdy.

Thus, it is an object of this invention to provide a method and/or apparatus of the type described permitting efficient and economic separation of the unwanted sections from a flexible product.

These as well as other objects of this invention will be readily understood with reference to the following specification and accompanying figures in which.

Briefly, this invention comprises a method of and/or apparatus for removing a section of a relatively flexible material from the surrounding material wherein the section boundary is initially weakened. A sharpened fixture or centering pin is brought into contact with the section in such a manner to at least partially penetrate it. Finally, a blunt fixture is brought into contact with the section and forced through the surrounding material while the sharpened fixture or centering pin is maintained in contact with the section to remove the plug. The presence of the centering pin or shapened fixture prevents the plug from sliding sideways under the influence of the blunt fixture and, thus, insures its complete detachment from the surrounding material.

Figure 1:
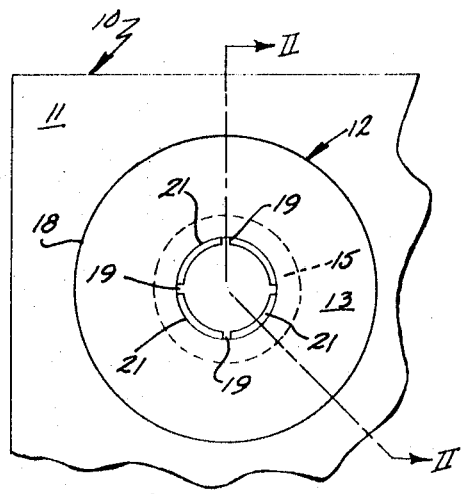
FIG. 1 is a fragmentary, plan view of a typical component-containing sheet after it has been removed from the mold and subsequent to the initial boundary-weakening process.

Referring now to the figures, a preferred embodiment of this invention will be described in detail. FIG. 1 illustrates a stock sheet 10 comprising a plurality of mold-formed components connected by a webbing 11. The webbing 11 is a result of the molding process and, of course, will be cut away as one of the final finishing steps of the individual components 12. It furnishes, on the other hand, a convenient means whereby the individual components may be handled in grid-like sheets prior to the final processing step.

In the embodiment illustrated, the particular component 12 comprises a resilient bushing or mounting suitable particularly for utilization in the automotive field. It has a cylindrical body section 13, a depending shoulder section 14 and a metallic reinforcing ring 15 which is placed in the mold prior to introduction of the rubbery material.

The inside diameter 16 of the component 12, subsequent to the molding process, is covered by a solid plug of rubbery material indicated generally by the reference numeral 17. As noted in the introduction to this application, it is usually necessary to make provisions for the formation of such a plug during the molding process in order to insure that the desirable structural properties will be present in the finished component.

When the sheet 10 is removed from the mold, the plugs 17 are joined to the inside diameter of the component 12 by a solid boundary of the rubbery material exactly in the same manner that the outer diameter of the component 12 is integrally connected to the webbing 11 along the boundary 18. In accordance with the teachings of a preferred embodiment of this invention, the boundary line between the inside-diameter plugs 17 and the surrounding material at shoulder 14 is initially weakened. As shown best in FIGS. 1 and 2, this weakening may be accomplished by cutting the plugs 17 away from the surrounding material with an interrupted die such a manner that, upon completion of the cutting process, the plugs 17 are connected to the surrounding shoulder 14 by a series of four rather small connecting islands 19. The reference numeral 21 in FIGS. 1 and 2 represent, thus, cutaway or void areas from which the connecting material has been removed by the die.

The cuts 21 may be formed in the sheet 10 in any conventional manner. It has been found satisfactory, for example, to place the sheet on a work platform in such a manner that the plugs 17 abut the working surface thereof and then bring a plurality of peripherally interrupted circular dies through the inside diameter 16 and into contact with the interior surface of the plugs 17. As the dies are forced against the working surface, the cuts 21 will be made. The dies may be forced in line by any conventional means such as a rolling-pin arrangement or, alternatively, may be simultaneously pressed against the working surface by other well-known types of presses.

Figure 2:
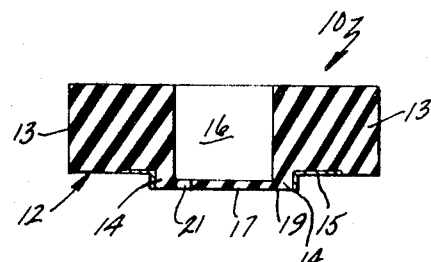
FIG. 2 is a cross-sectional view taken along the planes defined by the line II—II in FIG. 1.
Figure 3:
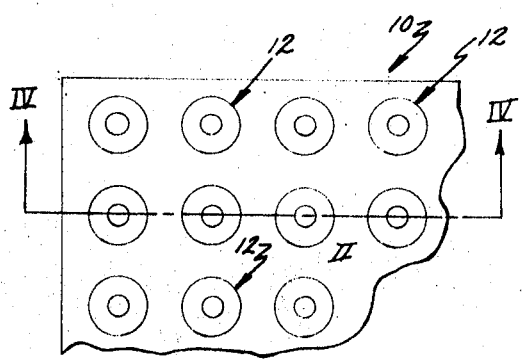
FIG. 3 is a plan view of the component sheet subsequent to its positioning on the work platform.

Thus, as illustrated in FIGS. 1 and 2, in the preferred embodiment of this invention the plugs 17 are initially intermittently cut about their boundaries with the component 12 as indicated. In this regard, it should be noted that any one of a number of other methods might be utilized to weaken the junction between the plugs 17 and the surrounding component 12. Merely by way of example, the mold might be formed such that the connecting skin at the boundary between the plug 17 and the component 12 was relatively thin about the entire periphery of the plug. In such a situation, it would not be necessary to weaken the plug-component boundary subsequent to the removal of the sheet 10 from the mold. All that is necessary is that the plug-component boundary be sufficiently weak to permit the removal of the plug by apparatus such as to be generally described hereinafter and, in the preferred embodiment of this invention, the weakening process should provide for the supporting of the plugs 17 via the connecting islands 19 at a plurality of locations spaced about the periphery of the plug. Such locating of the island 19, of course, prevents the plug from falling out of its original plane and hanging from the component in such a position that it may not be pierced by the retaining pin.

Referring now additionally to FIGS. 4 through 7, the plug removal assembly, indicated generally by the reference numeral 30, comprises a cylindrical punch member 31 having an axial passageway 32 therein. The outer configuration of the punch 31 conforms, preferably, to the interior configuration of the inside diameter 16 of the component 12. Thus, for example, in the event that the plugs 17 were square rather than round as illustrated, the exterior configuration of the punch 31 would be similarly formed according to the preferred teachings of this invention.

Mounted for sliding movement within the axial passageway 32 of punch 31 is a retaining pin or piercing fixture indicated generally by the reference numeral 33. Piercing fixture 33 has an elongated shank section 34 and a sharpened point 35.

Figures 5, 6:
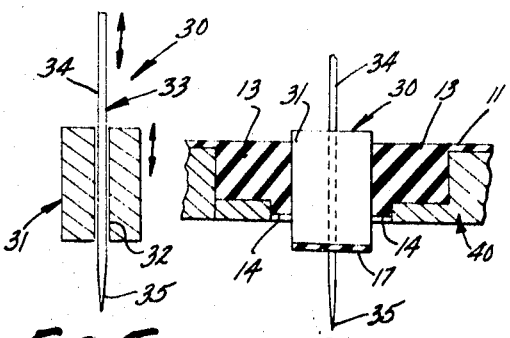
FIG. 5 is a schematic representation, partially in cross section, of the plug removal assembly.
FIG. 6 is a schematic illustration of the removal assembly during the plug-extraction step.
Figure 4:
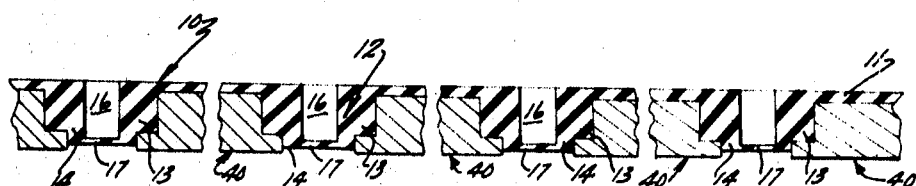
FIG. 4 is a cross-sectional view aken along plane IV—IV of FIG. 3.

As illustrated in FIG. 4, the sheet 10, subsequent to the plug-component weakening process described above, is placed on a work platform 40 containing a plurality of supporting apertures. The geometrical configuration of these apertures corresponds to the spacing of the components on the sheet 10. The plug removal assembly is lowered into the inside diameter 16 of the component with the penetrating fixture 33 in its extended position as shown in FIG. 6. The plug 17 is initially contacted by the pointed extremity 35 of fixture 33, which extremity pierces the plug without breaking it away at the islands 19 from the surrounding component material. As the plug removal assembly 30 is lowered further, the lower face of the cylindrical punch 31 abuts the plug and, as it passes through the plane of the lower boundary of shoulder 14, tears the plug away from the component and pushes it downwardly.

Figure 7:
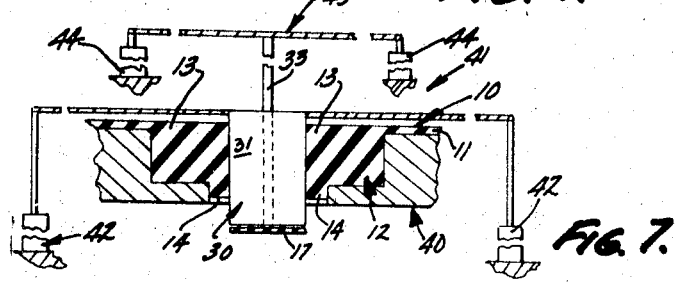
FIG. 7 is a schematic illustration of the plug-removal assembly and control jig assemblies therefor during retraction of the retaining pin.

Ordinarily, the rubbery material utilized in the fabrication of components of the type described (which may be either synthetic or natural depending upon the eventual working environment) will be retained on the shank 34 of the piercing fixture 33. The instant invention contemplates its removal therefrom by the relative movement of the piercing fixture 33 with respect to the punch 31 in an upward direction as indicated in FIG. 7. If such is effected during the period in which the plug removal assembly is in the position indicated in FIG. 7, the plug will drop free of the fixture 33 and into a suitable collection basket or the like which may be positioned beneath the work platform 40.

Subsequent to the pushing of the plug 17 from the shank 34 by the relative movement of punch 31, the entire plug removal assembly 30 is raised, the components 31 and 33 repositioned with respect to each other as illustrated in FIG. 6 and a new sheet 10 placed onto the platform 40 for plug removal. The sheet having the plugs removed may then be fed into a suitable die cutting machine to remove the webbing 11 from the component 12 and the individual components may be boxed ready for shipment or use.

Merely by way of schematic illustration, FIG. 7 illustrates the punch jig, indicated generally by the reference numeral 41, positioned for vertical movement toward and away from the platform 40 by means of cylinders 42. Similarly, a pin jig 43 operatively connected to cylinders 44 may be utilized to move the penetrating fixtures 33 toward and away from the platform 40. The two jigs may be controlled in such a manner that they move in unison when desired and, yet, independently of one another during the operational step of removing the plugs 17 from the shank 34 of the penetrating fixture 33. In this regard, it should be noted that the plugs 17 may be removed from shank 34 by pushing the punch 31 downwardly with respect to the stationary pin 33 as well as by drawing the pin upwardly (as shown in FIG. 7).

The pentration of the plug by the penetrating fixture 33 prior to the contacting thereof by the punch 31 functions to prevent the plug from tearing only partially loose from its associated component and sliding to the side as the punch passes through the inside diameter thereof. As will be readily apparent to those skilled in the art, there are a number of other modes of accomplishing this phenomenon. Merely by way of example, it would be entirely possible and certainly within the scope of this invention to position the penetrating fixture 33 below the sheet 10 and the punch 31 above it. In such an operation, the pin could move upwardly into penetrating relationship with the plug and, immediately thereafter, or simultaneously therewith, the punch moved downwardly against the upper surface thereof. If the pin 33 and axial slot 32 in the punch were maintained in aligned relationship, the punch would then push the plug 17 down onto the pin shank 34 and an identical result would be obtained. In this case, however, it would be necessary to provide a separate collar or the like for relative movement with respect to the pin 33 in order to remove the plugs 17 therefrom.

While a preferred embodiment of this invention has been illustrated in detail, it will be readily apparent to those skilled in the art that numerous other embodiments, some of which have been referred to as merely exemplary within this specification, may be conceived and fabricated without departing from the spirit of this specification and the accompanying drawings. Such other embodiments are to be deemed as included within the scope of the following claims unless these claims, by their language, expressly state otherwise.

I claim:

1. A method of removing a section of rubber material from the surrounding material comprising the steps of:
   forming a weakened boundary between said section and the surrounding material;
   penetrating at least partially said section with a penetrating fixture;
   bringing a blunt fixture into contact with said section; and
   forcing said blunt fixture through said surrounding material while maintaining said penetrating fixture in penetrating contact with said section.

2. The method as set forth in claim 1 wherein said blunt fixture has a passageway therethrough within which said penetrating fixture may slide and which further comprises the step of sliding said penetrating and blunt fixtures with respect to one another to displace said section from said penetrating fixture subsequent to its removal from said surrounding material.

3. The method as set forth in claim 1 which further comprises the step of moving said penetrating and blunt fixtures toward said section in the same direction with said penetrating fixture leading said blunt fixture.

4. The method as set forth in claim 3 which further comprises the step of supporting said surrounding material about the periphery of said section during said moving step.

5. The method as set forth in claim 1 which further comprises the step of moving said penetrating fixture with respect to a member such that said penetrating fixture recedes past the surface thereof whereby said section may be displaced from engagement with said penetrating fixture subsequent to its removal from said surrounding material.

6. Apparatus for removing a plug of rubbery material from the inner passageway of an integrally formed bushing, mounting or the like, said apparatus comprising:
   a penetrating fixture adapted to contact and at least partially penetrate said plug at a point removed from its peripheral boundary; and
   a blunt fixture adapted to contact said plug and force it away from the surrounding material while maintaining said penetrating fixture in penetrating contact therewith whereby said plug is prevented from deforming around said blunt fixture.

7. The apparatus as set forth in claim 6 wherein the working surface of said blunt fixture generally conforms geometrically to the shape of said plug.

8. The apparatus as set forth in claim 6 wherein said blunt fixture has an elongated aperture therethrough adapted to slideably receive said penetrating fixture.

9. The apparatus as set forth in claim 8 which further comprises means for slideably moving said blunt and penetrating fixtures with respect to each other such that said penetrating fixture recedes into said elongated aperture whereby said plug may be displaced from engagement with said penetrating fixture subsequent to its removal from said inner passageway.

10. The apparatus as set forth in claim 8 which further comprises means for moving said penetrating fixture with respect to a member such that said penetrating fixture recedes past the surface of said member whereby said plug may be displaced from engagement with said penetrating fixture subsequent to its removal from said inner passageway.

11. The apparatus as set forth in claim 5 which further comprises means for forming a weakened peripheral boundary between said plug and the surrounding passageway.

References Cited

UNITED STATES PATENTS

| 2,537,778 | 1/1951 | McCormick | 225—2 X |
| 3,060,782 | 10/1962 | Burgess | 225—94 X |

JAMES M. MEISTER, Primary Examiner

U.S. Cl. X.R.

225—93, 94